(No Model.)
W. A. D. GRAHAM.
TIRE.
No. 596,402. Patented Dec. 28, 1897.
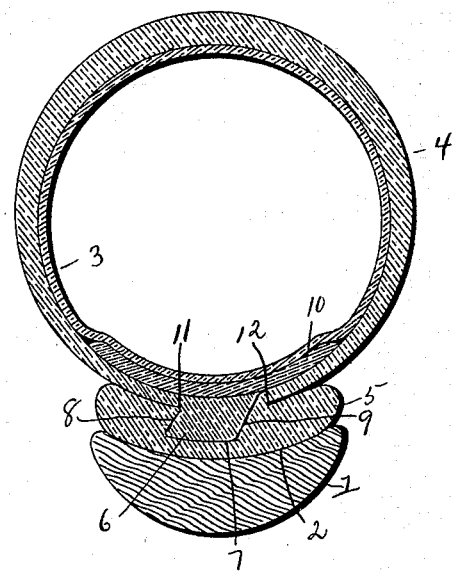
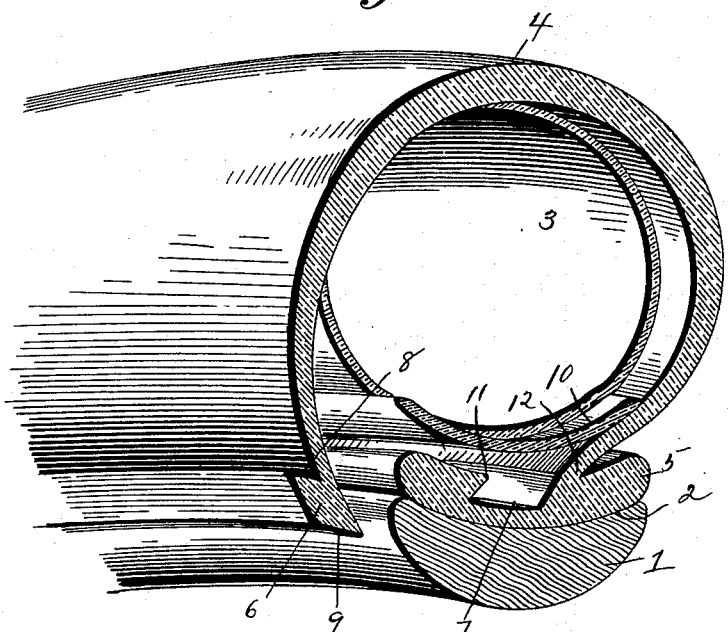

UNITED STATES PATENT OFFICE.

WILLIAM ALBERT DIXON GRAHAM, OF TORONTO, CANADA.

TIRE.

SPECIFICATION forming part of Letters Patent No. 596,402, dated December 28, 1897.

Application filed September 20, 1897. Serial No. 652,325. (No model.)

*To all whom it may concern:*

Be it known that I, WILLIAM ALBERT DIXON GRAHAM, a subject of the Queen of Great Britain, residing at Toronto, in the Province of Ontario and Dominion of Canada, have invented certain new and useful Improvements in Tires; and I do hereby declare the following to be a full, clear, and exact description of the invention, such as will enable others skilled in the art to which it appertains to make and use the same.

My invention has relation to pneumatic tires; and it consists in the novel construction and arrangement of its parts, as hereinafter described.

The object of my invention is to provide a tire particularly adapted for wooden rims which may be fastened within itself independently of the rim and thereby relieving all splitting pressure off the wood.

The further object of the invention is to so construct the tire as to prevent the rim from cutting the outer cover should the tire become deflated.

The further object of the invention is to provide a positive lock for the free edge of the cover, and the tire is so constructed that when the inner tube is inflated the tire will stand exactly and evenly perpendicular from the rim.

In the accompanying drawings, Figure 1 is a transverse sectional view of an inflated tire and the wheel-rim. Fig. 2 is a sectional view showing the rim and the tire in perspective.

The rim 1 is made of wood and is of ordinary construction, the said rim having the ordinary concaved periphery 2. The inner tube 3 is of ordinary construction. The outer cover 4 is thickest along the tread and gradually diminishes in thickness toward the edges. At one edge the cover 4 is integrally joined at an intermediate point to the cushion 5. The other edge of the cover 4 is provided with the enlargement 6, said enlargement being adapted to enter the recess 7, said recess being shaped to correspond with the shape of the enlargement 6. The side 8 of the enlargement 6 is pitched at an acute angle, and the side 9 of the said enlargement 6 is also pitched at a corresponding acute angle. The sides of the recess 7 are pitched at an acute angle to correspond with the angle of the sides 8 and 9. The enlargement 6 fits snugly within the recess 7, as shown in Fig. 1. The circumferential flap 10 is secured at one edge to the inner side of the outer cover 4, as shown in Fig. 2. The opposite edge of said flap is free. The enlargement 6 of the outer cover is adapted to slip under said flap, and thus in locking the enlargement 6 there is no danger of pitching the inner tube 3. As shown in Fig. 1, the outer edge 11 of the recess 7 is substantially the same distance from the perpendicular axis of the tire as the point 12, where the edge of the cover 4 is integrally joined to the cushion 5. Thus when the inner tube 3 is inflated the tire will stand up evenly and strictly perpendicular. Should the tube 3 become deflated, the edges of the cushion 5 will prevent the edges of the wheel-rim 1 from coming in contact with the outer cover 4, and thus the edges of the wheel-rim cannot cut the outer cover. The cushion 5 is made of flexible material, can be cemented to a wheel-rim having a periphery of any shape, and it can also be readily attached to rims having concaved peripheries irrespective of the degree to which the periphery is concaved.

Having described my invention, what I claim as new, and desire to secure by Letters Patent, is—

1. A tire consisting of a flexible cushion adapted to be secured to the wheel-rim, the outer cover integrally joined to the said cushion at an intermediate point between the edges of the cushion, an enlargement located at the opposite edge of the said outer cover, a recess located in the cushion and adapted to receive the enlargement of the cover, the locking edge of the recess and the point of junction between the cover and the cushion being substantially equidistant from the perpendicular axis of the tire, a flap secured at one edge to the inner side of the cover, said flap adapted to extend over the locking edge of the cover, an inner tube located within the cover.

2. A tire consisting of a flexible cushion adapted to be fixed to the wheel-rim, the outer cover integrally attached to the cushion at a point intermediate of the edges of the said cushion, an enlargement located at the opposite edge of the cover, said enlargement having inclined sides, said sides being substantially parallel to each other, a recess having similarly-inclined sides, said recess being located in the cushion and adapted to receive the enlargement of the cover, the locking edge of the cushion and the point of junction between the cover and the cushion being substantially equidistant from the perpendicular axis of the tire, a flap secured at one edge to the inner side of the cover, said flap adapted to pass over the enlargement, an air-tube located within the cover.

In testimony whereof I affix my signature in presence of two witnesses.

WILLIAM ALBERT DIXON GRAHAM.

Witnesses:
JAS. LAWRENCE,
THOS. COOK.